(12) United States Patent
Sundholm

(10) Patent No.: US 6,840,550 B2
(45) Date of Patent: Jan. 11, 2005

(54) PIPE JOINT REDUCING REQUIRED TIGHTENING FORCE, INCLUDING A TIGHTENING NUT WITH TWO THREADED SECTIONS WHOSE PITCHES DIFFER

(75) Inventor: Göran Sundholm, Tuusula (FI)

(73) Assignee: Marioff Corporation OY, Vantaa (FI)

(*) Notice: Subject to any disclaimer, the term of this patent is extended or adjusted under 35 U.S.C. 154(b) by 5 days.

(21) Appl. No.: 10/415,847

(22) PCT Filed: Oct. 23, 2001

(86) PCT No.: PCT/FI01/00917
§ 371 (c)(1),
(2), (4) Date: Sep. 12, 2003

(87) PCT Pub. No.: WO02/39000
PCT Pub. Date: May 16, 2002

(65) Prior Publication Data
US 2004/0046392 A1 Mar. 11, 2004

(30) Foreign Application Priority Data
Nov. 9, 2000 (FI) .............................. 20002463

(51) Int. Cl.[7] .............................. F16L 19/00
(52) U.S. Cl. .................. 285/341; 285/353; 285/354; 285/342
(58) Field of Search ................ 285/341–343, 285/353, 354, 382.7, 384, 385

(56) References Cited

U.S. PATENT DOCUMENTS

| | | | |
|---|---|---|---|
| 1,872,536 A | * 8/1932 | Weatherhead, Jr. | ...... 285/148.6 |
| 2,313,323 A | * 3/1943 | Cowies | ........................ 285/341 |
| 2,320,812 A | * 6/1943 | Cowles | .................... 285/334.5 |
| 2,479,447 A | 8/1949 | Wiltse | |
| 2,701,149 A | 2/1955 | Kreidel et al. | |
| 4,836,584 A | * 6/1989 | Baker | .......................... 285/351 |
| 5,156,421 A | * 10/1992 | Chauvel | ...................... 285/40 |
| 5,242,199 A | * 9/1993 | Hann et al. | ............. 285/148.19 |

FOREIGN PATENT DOCUMENTS

| | | | |
|---|---|---|---|
| DE | 2006458 | 8/1971 | |
| DE | 2054762 | 5/1972 | |
| DE | 3423600 | 1/1986 | |
| DE | 4141841 C1 | * 3/1993 | ........... F16L/15/06 |
| GB | 2163227 | 2/1986 | |
| NO | 149786 | 3/1984 | |
| SE | 8503339-7 | 6/1989 | |

* cited by examiner

Primary Examiner—James M. Hewitt
(74) Attorney, Agent, or Firm—Ladas & Parry LLP

(57) ABSTRACT

A pipe joint for joining a tubular component (1) to a receiving piece (2), the pipe joint comprising a fitting body (3) having a recess (8), a tightening nut (6a) having a first thread (7a), the fitting body having a corresponding thread (4), and a cutting ring (9) being arranged to be pressed between a wedge-like wall portion (10) of the recess, and the tubular component when the tightening nut is tightened. In order that the pipe joint could be tightened to form a leak-proof and strong joint using low torque, which enables the use of small tools applicable in confined spaces, the pipe joint comprises a supplementary nut (6b) having a thread (7c) whose handedness corresponds to that of the first thread (7a) but is smaller, the tightening nut comprising a second thread (7b) corresponding to that of the supplementary nut.

19 Claims, 2 Drawing Sheets

PRIOR ART

PIPE JOINT REDUCING REQUIRED TIGHTENING FORCE, INCLUDING A TIGHTENING NUT WITH TWO THREADED SECTIONS WHOSE PITCHES DIFFER

BACKGROUND OF THE INVENTION

The invention relates to a pipe joint for joining a tubular component to a receiving piece, the pipe joint comprising a fitting body having a recess for receiving the tubular component, a tightening nut having a first thread and a second thread, the fitting body having a first thread corresponding to the first thread of the tightening nut, and a cutting ring between the tightening nut and the fitting body, the cutting ring being arranged to be pressed between a wedge-like wall portion of the recess, and the tubular component when the tightening nut is tightened. The tightness of the joint is based on sealing achieved by the metallic "cutting ring". In this context, the term receiving piece refers to any point of attachment used in various applications of the pipe joint. For example, the receiving piece can be a wall of a container or a recipient, a pump, a thread of a tubular component, etc.

From DIN standard No. 2353 is known a joint whose tightness is not based on the use of a seal made of rubber material but on the sealing provided by a metallic cutting ring. When the tightening nut is turned towards the fitting body, the cutting ring presses in a wedge-shaped space towards the first tubular component cutting into an outer surface thereof and tightening against it, and at the same time it tightens towards inner surfaces of the tightening nut and the fitting body. The tighter the nut is turned, the closer the cutting ring cuts in the pipe and the joint becomes stronger. The DIN standard defines fittings for pipe diameters of 4 to 42 mm. The pitch of a thread at a first end of the fitting body, i.e. of a first thread, is 1 to 2 mm depending on the pipe size, so that the wider the pipe, the larger the pitch.

To provide the above-described sealing, the tightening nut must be turned with sufficient force. The tightening nut of a large joint must be turned with greater torque than the tightening nut of a small joint.

A problem with the above-described known joints can be that the torque required by the tightening nut is great particularly when large-diameter pipes are concerned. This problem becomes more apparent if the joint is located in a confined space without any room for big tools. Instead, one has to use a small tool that must be wrenched with great force in a confined space so as to achieve a sufficient torque and a firm joint. By using a smaller pitch in a tightening nut/fitting body combination the required torque would be lower, but firstly, fittings of this kind are not available, because the fitting bodies are standardized having relatively large pitches, and secondly, a smaller pitch is technically more difficult to manufacture than a larger pitch. Moreover, a very considerable fact is that a fine and long thread would be slow to mount.

BRIEF DESCRIPTION OF THE INVENTION

The object of the present invention is to provide a joint which can readily be tightened leak-proof and strong, even with small tools and in confined spaced, and nevertheless, which allows the use of a standardized fitting body.

For this purpose the present invention provides, according to one aspect thereof a pipe joint for joining a tubular component to a receiving piece, the pipe joint comprising a fitting body having a recess for receiving the tubular component, a tightening nut having a first thread and a second thread, the fitting body having a first thread corresponding to the first thread of the tightening nut, and a cutting ring between the tightening nut and the fitting body, the cutting ring being arranged to be pressed between a wedge-like wall portion of the recess, and the tubular component when the tightening nut is tightened, and a supplementary nut having a thread whose handedness and pitch corresponds to the second thread of the tightening nut and whose handedness corresponds to that of the first thread of the tightening nut, and wherein the pitch of the thread of the supplementary nut is smaller than the pitch of the first thread of the tightening nut, and the tightening nut is designed not to contact the cutting ring when tightening it.

For said purpose the present invention provides, as an alternative, a pipe joint for joining a tubular component to a receiving piece, the pipe joint comprising a fitting body having a recess for receiving the tubular component, a tightening nut having a first thread and a second thread, the fitting body having a first thread corresponding to the first thread of the tightening nut, and a cutting ring between the tightening nut and the fitting body, the cutting ring being arranged to be pressed between a wedge-like wall portion of the recess, and the tubular component when the tightening nut is tightened, and a supplementary nut having a thread whose handedness and pitch corresponds to the second thread of the tightening nut and whose handedness corresponds to that of the first thread of the tightening nut, and wherein the pitch of the thread of the supplementary nut is 20 to 80% of the pitch of the first thread of the tightening nut.

The cutting ring is arranged to press against the supplementary nut and the fitting body as the tightening nut is tightened. This ensures that the force acts on the cutting ring as intended.

It can be said that the supplementary nut according to the invention changes the gear ratio of the tightening nut thread: when the tightening nut is turned n turns, the cutting ring does not press/shift for a distance $S1=n \times p$, where p is the pitch of the fitting body, but the cutting ring presses/shift for a distance $S2=n \times p - n \times p2$, where p2 is the pitch of the supplementary nut, with the proviso that the supplementary nut is held in place to prevent it from turning while the tightening nut is turned. If the pitch p2 of the supplementary nut is close to the pitch p of the fitting body, an easily manufactured joint is obtained (because the thread pitch is relatively high), in which the cutting ring presses/is displaced only for a short distance, even though the tightening nut is turned several rounds n. A great force is transferred to the cutting ring by a small force acting on the tightening nut.

When the first thread of the tightening nut is an internal thread, the first thread of the fitting body is an external thread and the fitting body can be a DIN standard body. In addition, if the second thread (I) of the tightening nut is provided on the inner circumference of the tightening nut, the threads of the tightening nut are well protected against external impacts, if any, in the finished joint. Advantageously, the diameter (I) of the thread of the supplementary nut is smaller than the diameter of the first thread (f) of the tightening nut, whereby there is space for the supplementary nut to enter deep inside the tightening nut, in a space inside the first thread thereof, and consequently the joint becomes compact, tight for its size, and the allowance for joint adjustment becomes large.

The thread pitch of the supplementary nut is preferably 20 to 80%, and in many applications more preferably 20 to 60% of the pitch of the first thread (f) of the tightening nut.

The outer circumference of the supplementary nut is preferably smaller than the outer circumference of the tightening nut, which makes it very easy to apply the tools to nut surfaces, and it is extremely easy to tighten the joint and correspondingly to open it, if necessary.

The fitting body preferably comprises a nut-shaped outer circumference, which is smaller in size than the outer circumference of the tightening nut. Thus, the fitting body is preferably of standard size.

The inner diameter of the supplementary nut preferably corresponds to the diameter of the recess in the fitting body, and the inner surface of the supplementary nut fits on the outer surface of the tubular component supporting radially said tubular component.

At one end the supplementary nut preferably comprises a conical portion, whose inner diameter increases towards said end. Hence, the conical portion directs the force exerted on the cutting ring such that the cutting ring is effectively pressed onto the surface of the tubular component as the supplementary nut is turned.

Major advantages of the pipe joint according to the invention are that it can be tightened leak-proof and strong readily and quickly using low torque, which enables the use of small tools suitable for small spaces, if necessary. The above advantages are most apparent when large pipes having diameters of e.g. 30 to 80 mm are used. The pipe joint is easy to make and it allows the use of a standardized fitting body, which is naturally advantageous.

BRIEF DESCRIPTION OF THE DRAWINGS

In the following, the invention will be described in greater detail, by means of one preferred embodiment, with reference to the attached drawing, wherein.

DETAILED DESCRIPTION OF THE INVENTION

Figure 1:
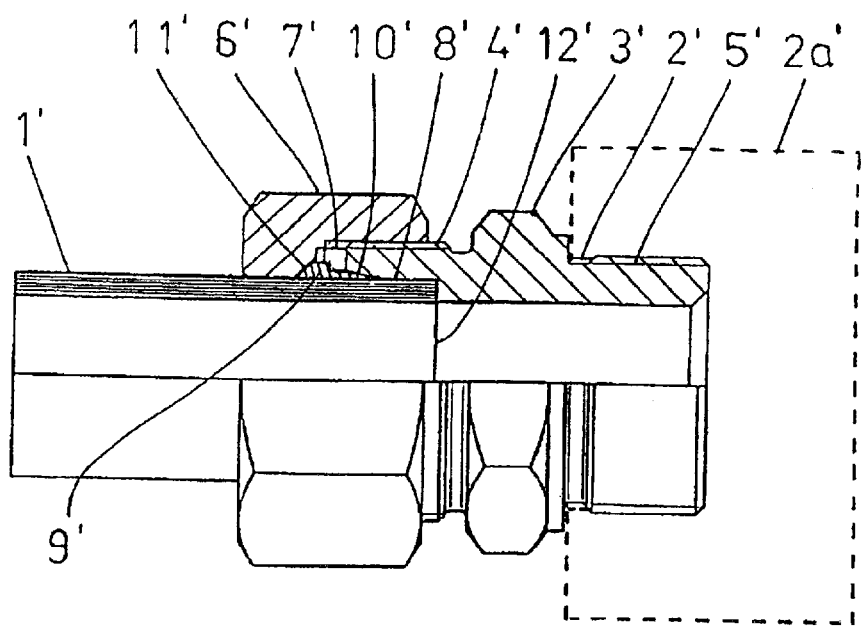
FIG. 1 shows a prior art pipe joint.

FIG. 1 shows a known pipe joint for joining a pipe $1'$ or a tubular component to a receiving piece $2'$, for instance to a wall of a container $2a'$, a pump (not shown) or a tubular component (not shown). The pipe joint comprises a fitting body $3'$, at a first end of which there is a first external thread $4'$ and at the opposite end a second external thread $5'$. The first thread $4'$ receives a corresponding internal thread $7'$ of a tightening nut $6'$. Reference numeral $8'$ designates a recess in the fitting body for receiving the end $12'$ of the pipe $1'$. Reference numeral $9'$ designates a cutting ring, which is positioned in part in a conical, i.e. wedge-like, wall portion $10'$ and in part in a conical portion $1'$ of the tightening nut $6'$. As can be seen from FIG. 1, the wall portion $10'$ adjoins to the recess $8'$ and thus actually defines in part the recess $8'$. As the tightening nut $6'$ is turned, the cutting ring $9'$ presses against the surface of the pipe $1'$ and provides sealing. The more the tightening nut $6'$ is turned, the closer the cutting ring cuts into the surface of the pipe and the stronger the joint will be. The pipe $1'$ is e.g. 42 mm in diameter and the pitch of the fitting body thread $4'$ is 2 mm. So, when the tightening nut $6'$ is turned one round, the tightening nut shifts 2 mm to the right. The external thread $5'$ is for attachment to the receiving piece $2'$.

Figure 2:
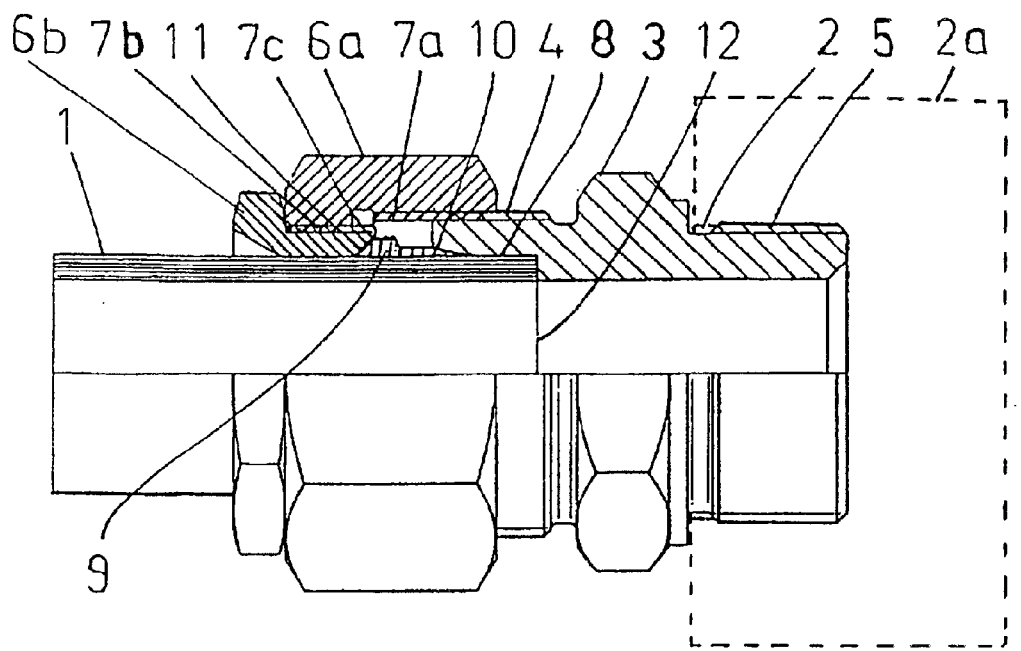
FIGS. 2 to 4 show a pipe joint according to the invention.
Figure 3:
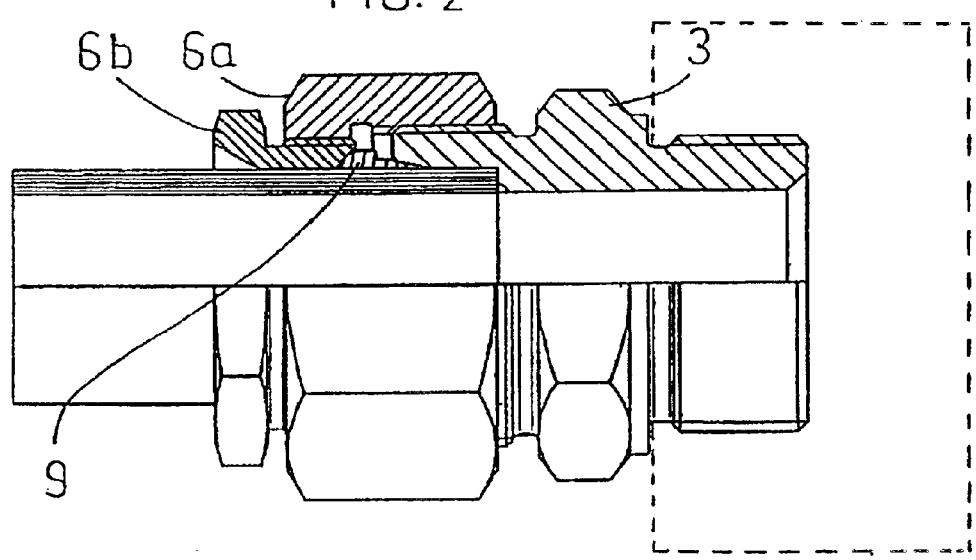

FIG. 2 shows a pipe joint according to the invention. FIG. 3 shows the joint of FIG. 2 when tightened up into a firm joint.

The fitting body 3 of the pipe joint corresponds to the fitting body $3'$ of FIG. 1 and is in accordance with DIN standard No. 2353. The pipe joint of the figure differs from that of FIG. 1 in such a way that, instead of one single tightening nut, the joint comprises two nuts: a tightening nut $6a$ and a so-called supplementary nut $6b$. The tightening nut $6a$ comprises a first thread $7a$, whose pitch corresponds to the pitch of the thread 4 in the fitting body. The tightening nut $6a$ comprises a second internal thread $7b$, the supplementary nut $6b$ having a corresponding external thread $7c$. The turning direction of the internal thread $7b$ corresponds to that of the first thread $7a$ but the pitch is lower. The pitch of the first thread $7a$ is 2 mm and the pitch of the internal thread $7b$ is 1 mm. Naturally, the above values are just examples. More generally, it can be said that the pitch of the thread $7b$ is 20 to 80% of the pitch of the thread $7a$, whereby the range of 20 to 60 would cover most of the practical applications. If the pitch of the thread $7b$ were extremely low, the manufacturing thereof would become difficult.

The pipe 1 of FIG. 2 can be sealed to the fitting body 3 such that the tightening nut $6a$, the supplementary nut $6b$ and the cutting ring 9 are mounted round the pipe end, and then the pipe end is inserted in the recess 8 of the fitting body. Thereafter, the tightening nut $6a$ is turned so that the cutting ring 9 fits against the wall portion 10 of the fitting body 3 and against a conical portion at the end of the supplementary nut. After that, tightening of the tightening nut $6a$ is continued, and simultaneously, the supplementary nut $6b$ is held in place such that it will not turn with respect to the fitting body. Hence, as the tightening nut $6a$ is turned two rounds, for instance, it moves 2×2=4 mm to the right. However, the supplementary nut $6b$ moves simultaneously 2×1 mm=2 mm to the left with respect to the tightening nut $6a$, whereby the supplementary nut $6b$ presses the cutting ring 4−2=2 mm to the right axially. Because of this, the force for turning the tightening nut $6a$ remains low as compared with the solution of FIG. 1, even though the last mentioned needs to be turned only one round for moving the cutting ring 2 mm to the right.

FIG. 3 shows a leak-proof, strong joint, in which the cutting ring 9 is cut in the surface of the pipe 1.

As the inner diameter of the supplementary nut $6b$ corresponds to the outer diameter of the pipe 1, the supplementary nut supports the pipe radially.

The diameter of the first thread $7a$ of the tightening nut $6a$ exceeds that of the second thread $7b$, whereby the end of the supplementary nut $6b$ can be inserted inside the thread $7a$. A compact pipe joint with a large allowance for adjustment/tightening is thus achieved. The outer circumference of the supplementary nut $6b$ is smaller than the outer circumference of the tightening nut $6a$, and consequently tools can be easily applied to the nuts.

Figure 4:
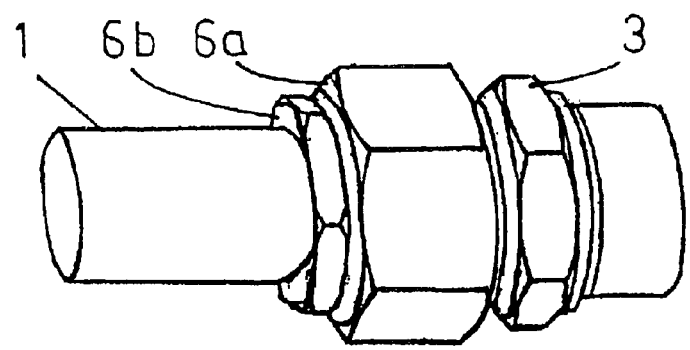

FIG. 4 shows an axonometric view of the joint according to the invention.

In the above, the invention is only described by means of one preferred embodiment, and therefore it should be noted that the details of the invention can be implemented in a variety of ways within the scope of the accompanying drawings. Thus, the tightening nut, for instance, may at least in principle comprise an external thread, instead of the internal thread, and consequently the supplementary nut should correspondingly comprise an internal thread. However, the latter solution would make the fitting larger and external threads would be exposed to external impacts. Application of tools would also be more difficult.

What is claimed is:

1. A pipe joint for joining a tubular component to a receiving piece, the pipe joint comprising a fitting body having a recess for receiving the tubular component, a tightening nut having a first thread and a second thread, the fitting body having a first thread corresponding to the first thread of the tightening nut, and a cutting ring between the tightening nut and the fitting body, the cutting ring being arranged to be pressed between a wedge-like wall portion of the recess, and the tubular component when the tightening nut is tightened, and a supplementary nut having a thread whose handedness and pitch corresponds to the second thread of the tightening nut and whose handedness corresponds to that of the first thread of the tightening nut, and wherein the pitch of the thread of the supplementary nut is smaller than the pitch of the first thread of the tightening nut, and the tightening nut is designed not to contact the cutting ring when tightening it.

2. A pipe joint for joining a tubular component to a receiving piece, the pipe joint comprising a fitting body having a recess for receiving the tubular component, a tightening nut having a first thread and a second thread, the fitting body having a first thread corresponding to the first thread of the tightening nut, and a cutting ring between the tightening nut and the fitting body, the cutting ring being arranged to be pressed between a wedge-like wall portion of the recess, and the tubular component when the tightening nut is tightened, and a supplementary nut having a thread whose handedness and pitch corresponds to the second thread of the tightening nut and whose handedness corresponds to that of the first thread of the tightening nut, and wherein the pitch of the thread of the supplementary nut is 20 to 80% of the pitch of the first thread of the tightening nut.

3. A pipe joint as claimed in claim 1, wherein the pitch of the thread of the supplementary nut is 20 to 80% of the pitch of the first thread of the tightening nut.

4. A pipe joint as claimed in claim 1, wherein the cutting ring is arranged to press against the supplementary nut and the fitting body as the tightening nut is tightened.

5. A pipe joint as claimed in claim 1, wherein the second thread of the tightening nut is provided on an inner circumference of the tightening nut, whereby the thread of the supplementary nut is an external thread.

6. A pipe joint as claimed in claim 1, wherein first thread of the tightening nut is an internal thread, whereby the first thread of the fitting body is an external thread.

7. A pipe joint as claimed in claim 6, wherein the diameter of the thread of the supplementary nut is smaller than the diameter of the first thread of the tightening nut.

8. A pipe joint as claimed in claim 1, wherein the outer circumference of the supplementary nut is smaller in size than the outer circumference of the tightening nut.

9. A pipe joint as claimed in claim 1, wherein the fitting body comprises a nut-like outer circumference that is smaller in size than the outer circumference of the tightening nut.

10. A pipe joint as claimed in claim 1, wherein the inner circumference of the supplementary nut is equal to the diameter of the recess in the fitting body.

11. A pipe joint as claimed in claim 10, wherein the supplementary nut comprises at one end a conical portion whose inner diameter increases towards said end.

12. A pipe joint as claimed in claim 1, wherein the fitting body comprises at an end opposing the recess a thread to be connected to the receiving piece.

13. A pipe joint as claimed in claim 2, wherein the cutting ring is arranged to press against the supplementary nut and the fitting body as the tightening nut is tightened.

14. A pipe joint as claimed in claim 2, wherein the second thread of the tightening nut is provided on an inner circumference of the tightening nut, whereby the thread of the supplementary nut is an external thread.

15. A pipe joint as claimed in claim 2, wherein first thread of the tightening nut is an internal thread, whereby the first thread of the fitting body is an external thread.

16. A pipe joint as claimed in claim 2, wherein the outer circumference of the supplementary nut is smaller in size than the outer circumference of the tightening nut.

17. A pipe joint as claimed in claim 2, wherein the fitting body comprises a nit-like outer circumference that is smaller in size than the outer circumference of the tightening nut.

18. A pipe joint as claimed in claim 2, wherein the inner circumference of the supplementary nut is equal to diameter of the recess in the fitting body.

19. A pipe joint as claimed in claim 2, wherein the fitting body comprises at an end opposing the recess a thread to be connected to the receiving piece.

* * * * *